United States Patent [19]

Kelly

[11] 4,299,080
[45] Nov. 10, 1981

[54] CROP DIVIDER FOR A HARVESTER

[76] Inventor: Ronald Kelly, R.R. #1, Tampico, Ill. 61283

[21] Appl. No.: 172,856

[22] Filed: Jul. 28, 1980

[51] Int. Cl.³ .................................................. A01D 63/00
[52] U.S. Cl. ............................................................ 56/314
[58] Field of Search .................................. 56/314–320, 56/119

[56] References Cited

U.S. PATENT DOCUMENTS

| | | | |
|---|---|---|---|
| 1,590,577 | 6/1926 | Hamilton | 56/119 |
| 1,688,137 | 10/1928 | Wilkes et al. | 56/13.9 |
| 1,882,875 | 10/1932 | Pierson | 56/314 |
| 2,153,461 | 4/1939 | Gooden | 56/320 |
| 2,618,114 | 11/1952 | Gaterman, Sr. | 56/314 |
| 2,667,728 | 2/1954 | Dray | 56/181 |
| 2,679,719 | 6/1954 | Hill | 56/314 |
| 2,688,226 | 9/1954 | Kittelson | 56/192 |
| 3,596,454 | 8/1971 | Kluck | 56/314 |
| 3,881,305 | 5/1975 | Burrough | 56/257 |
| 3,885,377 | 5/1975 | Jones | 56/314 |
| 3,967,439 | 7/1976 | Mott | 56/314 |

FOREIGN PATENT DOCUMENTS 360150  11/1931  United Kingdom .................. 56/314

Primary Examiner—Jay N. Eskovitz
Attorney, Agent, or Firm—Wegner, Stellman, McCord, Wood & Dalton

[57] ABSTRACT

A crop divider pivotably mounted to the end of a harvesting platform about a horizontal axis, said divider having a plate with a reinforcing frame and two convexly curved surfaces tapered from front to rear. The leading curved surface is sloped rearwardly and is curved inwardly toward the harvesting platform. The rear curved surface is curved outwardly away from the harvesting platform.

11 Claims, 8 Drawing Figures

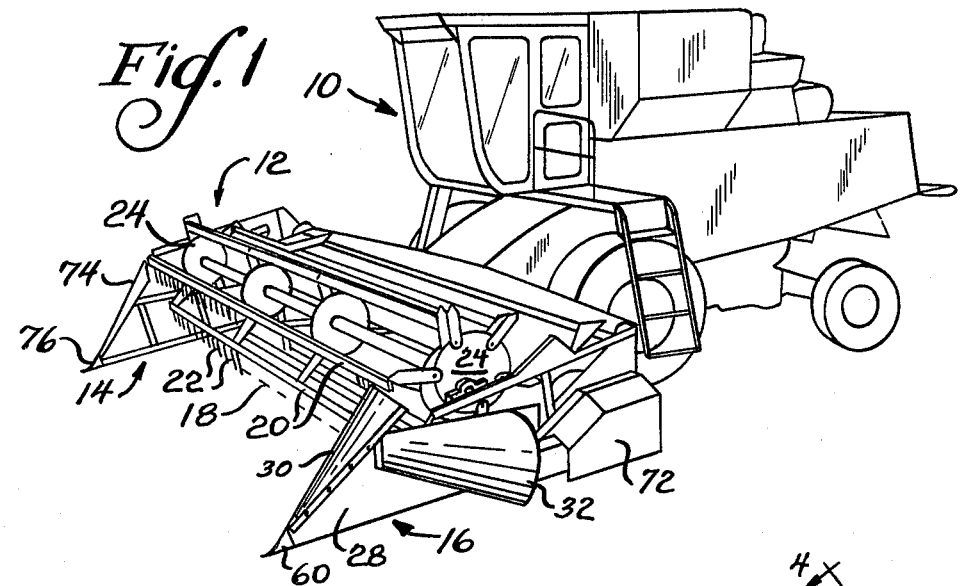
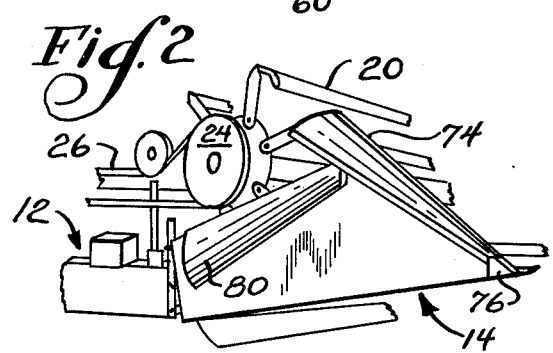
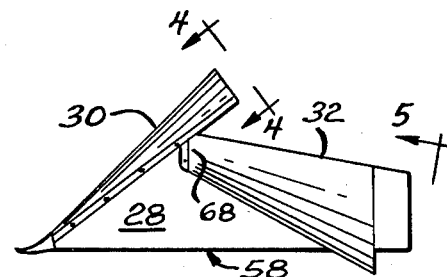
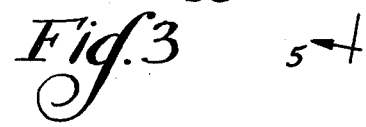
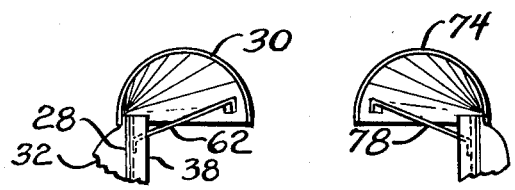
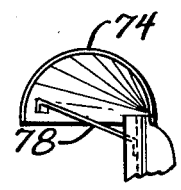
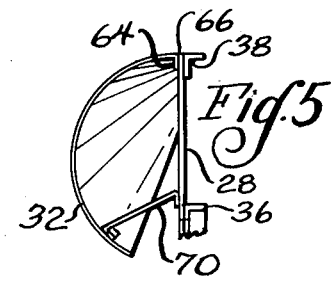
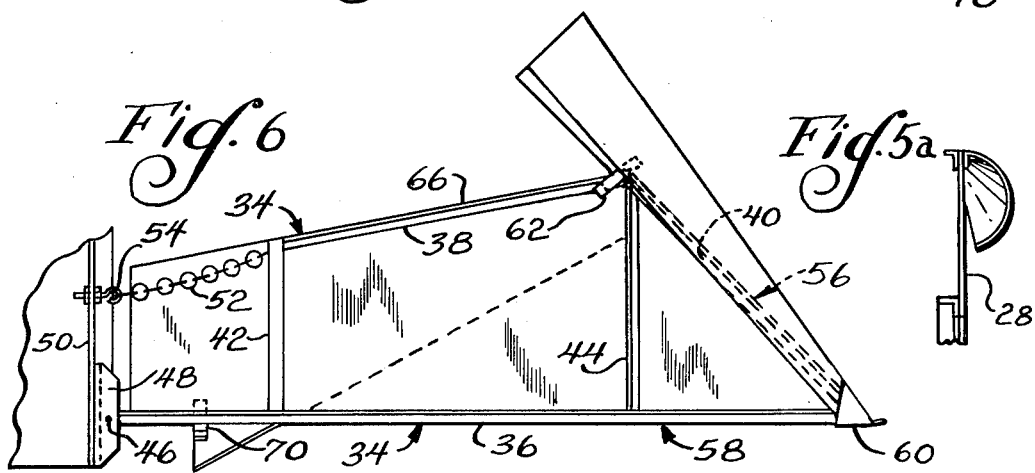
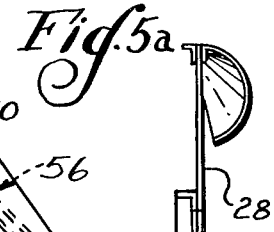

CROP DIVIDER FOR A HARVESTER

BACKGROUND OF THE INVENTION

1. Field of the Invention

This invention relates to a machine for harvesting crops, and more particularly to an improved crop divider provided at the end of a harvesting platform to divide the crop that is to be harvested from the standing crop.

2. Description of the Prior Art

Crop dividers are well known in the art and are provided so that the leading end projects into the crops as the harvesting machine approaches those crops. The dividers are located at each end of the harvesting platform and force crops to be harvested into the harvesting platform while protecting the end of the harvesting platform from those crops which are not harvested. This is intended to prevent the ends of the harvesting platform, particularly the cutter reel, from being jammed up with tangled crops. When tangled crops do jam up the operation of the harvester, the operator is required to make frequent stops to remove them, thereby greatly reducing efficiency.

One type of crop divider which has heretofore been used consists of a double wall divider having separate inner and outer surfaces which flare apart away from the leading edge. Examples of this type of divider may be found in Mott U.S. Pat. No. 3,967,439, Kluck U.S. Pat. No. 3,596,454 and Wilkes et al. U.S. Pat. No. 1,688,137. With these dividers, the inner wall forces crops toward the harvesting platform while the outer wall forces the standing crop away from the end of the harvesting platform. However, because the inner wall is adjacent the end of the cutter reel, it only forces the crops near the end of the cutter reel. This still can result in crops entangling in the end of the reel and in other harvester mechanisms as well.

Other crop dividers such as disclosed in Jones U.S. Pat. No. 3,885,337 use only a single wall divider and a curved leading surface divides the crops as it passes through them. However, once the leading surface passes the crops, they are divided only by a single wall, enabling the crops on both sides of the divider to occasionally become tangled again. Also, those which have used a single wall, such as U.S. Pat. No. 3,885,337, have curved the leading surface outward so that, as with the double wall dividers, the harvested crops are only forced near the end of the cutter reel. Accordingly, some crops still are occasionally entangled in the end of the cutter reel.

SUMMARY OF THE INVENTION

The applicant's crop divider consists of a plate pivotably secured to the header end of the harvesting platform, this plate being a quadrilateral with a top edge, rear edge, bottom edge and leading edge, the leading edge and bottom edge forming an acute angle at their junction. A leading convexly curved surface is secured along the leading edge of the plate and is curved inwardly from that edge toward the cutter reel of the harvesting platform. A rear convexly curved surface is attached to the top edge of the plate and is curved outwardly away from the cutter reel. Both curved surfaces are tapered from front to rear so that they are generally semi-conical in shape.

In the preferred embodiment of this invention, a frame is provided along the edges of the plate for reinforcement, the members of the frame being easily attached to the header end to support the crop divider.

One object of this invention is to provide a simple crop divider which is easy to install and adjust. Another object of this invention is to provide a crop divider which may be inexpensively produced using a minimum amount of material. Still another object of this invention is to provide a crop divider which forces crops inwardly beyond the end of the cutter reel, thereby protecting the ends of the reel from becoming jammed and tangled with crops.

Other aspects, objects and advantages of this invention can be obtained from a study of the drawings, the specification and the appended claims.

BRIEF DESCRIPTION OF THE DRAWINGS

FIG. 1 is a perspective view of a harvester having the inventive crop dividers attached to its harvesting platform;

FIG. 2 is a perspective view of a portion of the harvesting platform showing the right crop divider;

FIG. 3 is a plan view of the left crop divider;

FIG. 4 is a partial view of the leading curved surface as viewed along line 4—4;

FIG. 4a is a view similar to FIG. 4 showing the leading curved surface of the right crop divider;

FIG. 5 is a partial view of the rear curved surface of the left crop divider taken along line 5—5;

FIG. 5a is a view similar to FIG. 5 showing the rear curved surface of the right crop divider; and FIG. 6 is a partially broken plan view of the inner side of the left crop divider showing its attachment to the harvesting platform.

DESCRIPTION OF THE PREFERRED EMBODIMENT

A conventional harvester 10 and grain harvesting platform 12 having the applicant's crop dividers 14, 16 are shown in FIG. 1. The cutter reel 18 shown is conventional having reel bats 20 and reel fingers 22. The end plates 24 of the reel 18 are pivotably mounted to the harvesting platform 12 and are driven in a conventional manner, as by the drive belt 26 shown in FIG. 2.

During harvesting, the harvester 10 is driven through the crops, forcing them into the rotating cutter reel 18 and harvesting platform 12. The harvesting platform 12 then processes these cut crops, for example, by threshing grain to separate the seeds from the chaff. Further details of the operation of the harvester 10 and harvesting platform 12 are not necessary for an understanding of this invention.

The crop dividers 14,16 are shown in detail in FIGS. 3–6. The left crop divider 16 is shown in FIGS. 3, 4, 5 and 6 and consists basically of a plate 28 to which are attached two oppositely extending convexly curved surfaces 30,32 which force the crops both inward and outward. The plate 28 is essentially a quadrilateral sheet of metal and has a frame 34 secured to its inside surface by suitable means, such as welding, screws or rivets. The frame 34 has a bottom member 36, a top member 38, a leading edge member 40, and two vertical frame members 42,44 secured to each other and the plate 28 as shown in FIG. 6. This frame 34 greatly strengthens the plate 28 and accordingly prevents bending to twisting.

The bottom frame member 36 extends slightly beyond the rear end of the plate 28 and is pivotably connected by a bolt or pin 46 to a bracket 48 on the header end 50 of the harvesting platform 12. The rear vertical frame member 48 at its upper end is connected by a chain 52 to an eyebolt 54 which is bolted to a point on the header end 50 above the bracket 48. The entire weight of the divider 16 is thus supported in cantilever fashion on the harvesting platform 12 by the bracket 48 and eyebolt 54 so that it rides above the ground during operation. The chain 52 and eyebolt 54 can be adjusted to raise or lower the front end of the divider 16 to a level appropriate for the crops being harvested. The divider 16 can be raised to a level for safe nonharvesting transport (as shown in FIG. 2) though, with conventional harvesters, the entire harvesting platform 12 may also be raised for such transport.

The bottom frame member 36 at its forward end forms a point with a leading edge frame member 40, the latter frame member 40 being adjacent the leading edge 56 of the plate 28. These frame members 36,40 together with the bottom and leading edges 58,56 of the plate 28 define an acute angle, preferably in the range of 30° to 60°, at the front portion of the divider 16.

A toe 60 encloses and protects the front portion of the divider 16. The toe 60 is curved upward so that when it encounters a mound of earth, the divider 16 will be pivoted up around the bracket 48 and the toe 60 will ride over the earth. If the toe 60 were able to stick in the ground, the divider 16 might be extensively damaged.

The leading curved surface 30 is attached to the plate 28 along the leading edge 56 by suitable means such as screws or rivets. The surface 30 is made of sheet metal which is bent inwardly (toward the cutter reel 18) from the plate 28. The surface 30 is convex and tapered from front to rear so as to be generally conically shaped with its point at the toe 60 on the front portion of the divider 16. The rear portion of the curved surface 30 is approximately one foot in diameter extending inward to align with the second or third reel finger 22 from the end of the cutter reel 18. This forces crops totally into the cutter reel 18 and away from its end plates 24, thereby greatly reducing the risk of crops becoming entangled at the end of the cutter reel 18 in the fingers 22 or drive belt 26. A brace 62 is provided between the top frame member 38 and the rear end of the curved surface 30 to secure the surface 30 in position and prevent distortion of the surface 30 by continual use.

A flange 64 along one side of the rear curved surface 32 is attached to the upper edge 66 of the plate 28 in a suitable manner like the leading curved surface 30. The surface 32 consists of sheet metal which is bent outwardly (away from the cutter reel 18) from the plate 28 and also is convex and tapered from front to rear, the outermost point being about one foot from the plate 28. This surface 32 approximates a slightly truncated cone having its smaller end 68 distorted to lie flush against the plate and is, like the leading curved surface 30, supported to the plate 28 at its rear end by a brace 70.

FIGS. 3 and 5 show the rear curved surface 32 of the left divider 16. Because harvesting platforms 12 have a drive mechanism 72 (FIG. 1) for the components behind the cutter reel 18, which mechanism 72 extends from the left end of the platform 12, this large curved surface 32 is provided on the left divider 16 so as to force the unharvested crops clear of that drive mechanism 72.

The right crop divider 14 is shown in FIGS. 4a, 5a and 6. Its leading curved surface 74 essentially mirrors the leading surface 30 of the left divider 16. It also is generally conically shaped having its point at the toe 76 on the front portion and is secured in its shape by a brace 78 at the rear end of the surface.

The rear curved surface 80 of the left divider 14 also essentially mirrors the rear curved surface 32 of the left divider 16 except that its conical shape is not flared so greatly (compare FIGS. 2 and 5a with FIGS. 3 and 5). The right end of the harvesting platform 12 does not have a projection similar to the drive mechanism 72 on the left end, enabling this surface to be made smaller. The right divider 14 is attached to the harvesting platform 12 with a bracket-chain construction like that on the left crop divider 16.

I claim:

1. A crop divider adapted for attachment to a harvester or the like for forcing crops to be harvested inward toward a cutter reel and away from crops immediately adjacent thereto, comprising:
   a plate having a bottom edge, a leading edge forming an acute angle with said bottom edge, a top edge and a rear edge;
   a first forcing surface attached along said leading edge of said plate, said surface being convexly curved toward said cutter reel from said plate and tapered from a pointed end located at said acute angle;
   a second forcing surface secured along said top edge of said plate, said surface being convexly curved on the outside of said plate and tapered with the smaller end in the front near said leading edge.

2. The crop divider of claim 1, further comprising a reinforcing frame attached to the inner side of said plate, said frame having members extending along said bottom, top and leading edges.

3. The crop divider of claim 2, further comprising:
   means on a header end of the harvester for pivotably connecting said bottom frame member; and
   chain means for connecting said top frame member to said header end.

4. The crop divider of claim 1, further comprising brace means extending from said plate to the outer edges of said forcing surfaces.

5. The crop divider of claim 1, wherein said first forcing surface extends beyond the end of said cutter reel.

6. A crop divider adapted for attachment to the grain platform of a harvester for forcing crops to be harvested inward toward a cutter reel and away from crops immediately adjacent thereto, comprising:
   a plate having a bottom edge, a leading edge extending upwardly and inclined rearwardly from the front of the bottom edge, a top edge extending rearwardly from the top of the leading edge and a rear edge extending downwardly from the top edge to the bottom edge;
   means connecting said plate with the grain platform of a harvester to extend forwardly therefrom at one end of the cutter reel;
   a first generally semi-conical forcing surface secured along the leading edge of said plate, extending inwardly therefrom in front of said cutter reel, said first forcing surface being tapered from an apex at the juncture of the leading and bottom edges to its widest dimension at the rear, said first forcing surface being convex from said plate; and
   a second generally semi-conical forcing surface secured along the top edge of said plate and extending outwardly and downwardly therefrom, said second forcing surface being tapered from an apex at the juncture of the top and leading edges of said plate to its widest dimension at the rear, said surface being convex from said plate.

7. The crop divider of claim 6, further comprising a reinforcing frame attached to the inner side of said plate, said frame having members extending along said bottom, top and leading edges.

8. The crop divider of claim 7, wherein said means connecting said plate with the grain platform comprises:
 means on a header end of the harvester for pivotably connecting said bottom frame member; and
 chain means for connecting said top frame member to said header end.

9. A crop divider for a harvester having a grain platform with a cutter reel, comprising:
 a pair of divider plates, one attached to each end of said grain platform, both plates having a bottom edge, a leading edge extending upwardly and inclined rearwardly from the front of the bottom edge and a top edge extending rearwardly from the leading edge;
 a tapered semi-conical surface extending inwardly toward said grain platform along the leading edge of each of said plates; and
 a tapered semi-conical surface extending outwardly along the top surface of each of said plates.

10. The crop divider of claim 9, wherein each of said inwardly extending surfaces projects inward beyond the end of said cutter reel.

11. The crop divider of claim 9, further comprising with each of said plates:
 a reinforcing frame attached to the inner side of said plate, said frame having members extending along said bottom, top and leading edges;
 means on the grain platform for pivotably connecting said bottom frame member; and
 chain means for connecting said top frame member to said header end.

* * * * *